(12) United States Patent
Lee et al.

(10) Patent No.: US 6,777,077 B2
(45) Date of Patent: Aug. 17, 2004

(54) PERPENDICULAR MAGNETIC THIN FILM FOR ULTRAHIGH DENSITY RECORDING

(75) Inventors: Kyung-jin Lee, Kyungki-do (KR); Taek-dong Lee, Seoul (KR); In-seon Lee, Seoul (KR); Min-sik Hwang, Jeollabuk-do (KR)

(73) Assignees: Samsung Electronics Co., Ltd., Suwon-Si (KR); Korea Advanced Institute of Science and Technology, Yuseong-Gu (KR)

( * ) Notice: Subject to any disclaimer, the term of this patent is extended or adjusted under 35 U.S.C. 154(b) by 24 days.

(21) Appl. No.: 10/038,604

(22) Filed: Jan. 8, 2002

(65) Prior Publication Data

US 2002/0122961 A1 Sep. 5, 2002

(30) Foreign Application Priority Data

Jan. 10, 2001 (KR) ......................................... 2001-1352

(51) Int. Cl.[7] ............................. G11B 5/66; G11B 5/70; H01J 1/00
(52) U.S. Cl. ........................ 428/336; 428/611; 428/667; 428/694 TS; 428/900
(58) Field of Search ............................... 428/64.3, 64.9, 428/65.7, 332, 336, 611, 667, 694 TS, 694 TM, 900; 427/129, 130, 131, 132; 204/192.2

(56) References Cited

U.S. PATENT DOCUMENTS

| | | | |
|---|---|---|---|
| 5,523,173 A | | 6/1996 | Doerner et al. |
| 5,863,631 A | | 1/1999 | Sonobe et al. |
| 6,083,599 A | | 7/2000 | Hirayama et al. |
| 6,156,404 A | * | 12/2000 | Ross et al. ................. 428/65.3 |
| 6,183,832 B1 | * | 2/2001 | Margulies et al. ......... 428/65.7 |
| 6,432,563 B1 | * | 8/2002 | Zou et al. ............... 428/694 TS |
| 6,447,936 B1 | * | 9/2002 | Futamoto et al. ..... 428/694 TM |
| 6,500,567 B1 | * | 12/2002 | Bertero et al. .............. 428/336 |

FOREIGN PATENT DOCUMENTS

| | | |
|---|---|---|
| JP | 05 266464 | 10/1993 |
| JP | 07 192244 | 7/1995 |

OTHER PUBLICATIONS

Taek Dong Lee et al., "Effects of Magnetic Layer Thickness on Negative Nucleation Field and Cr Segregation Behavior in CoCrPt/Ti Perpendicular Media", Journal of Manetism and Magnetic Materials, vol. 235 (2001), pp. 297–304.
K. J. Lee et al, "Step–Like Energy Barrier Variations of High KU Material", Digest submitted abstract for Intermag 2002.
L. Wu et al., "Low Noise Co/Pd Multilayer Media for Perpendicular Magnetic Recording", IEEE Trans. Magn., vol. 35 (1999) pp. 2775–2777.
Y. Sonobe et al., "Composite Perpendicular Recording Medium Consisting of CoCrPt With Large Hk and CoCr With Positive Inter–particle Interaction", IEEE Transactions on Magnetics, vol. 35, No. 5, Sep. 1999, pp. 2769–2771.
Y. Ikeda et al., "High Signal–to–Noise Ratio of a Cr–Rich CoCrPt perpendicular Medium With A Large Medium Thickness", IEEE Transactions on Magnetics, vol. 33, No. 5, Sep. 1997, pp. 3079–3081.

* cited by examiner

Primary Examiner—Holly Rickman
(74) Attorney, Agent, or Firm—Burns, Doane, Swecker & Mathis, L.L.P.

(57) ABSTRACT

A perpendicular magnetic recording medium is provided. The perpendicular magnetic recording medium has an underlayer for leading perpendicular orientation of a perpendicular magnetic recording layer, stacked between a substrate and the perpendicular magnetic recording layer, and thickness of the perpendicular magnetic recording layer is controlled within the range of 5–40 nm to have a negative nucleation field.

14 Claims, 6 Drawing Sheets

PERPENDICULAR MAGNETIC THIN FILM FOR ULTRAHIGH DENSITY RECORDING

Priority is claimed to Patent Application Number 2001-1352, filed in the Republic of Korea on Jan. 10, 2001, herein incorporated by reference.

BACKGROUND OF THE INVENTION

1. Field of the Invention

The present invention relates to a magnetic recording medium, and more particularly, to a perpendicular magnetic recording medium which is used in hard disk drives (HDDs) and is capable of increasing thermal stability and a signal to noise ratio (SNR) when recording information.

2. Description of the Related Art

Hard disk drives (HDDs), the main apparatuses for storing information have been continuously evolving to meet ever-increasing demands for high density and lower price. Recently areal recording density has been increasing by more than 100% annually due to the developments of giant magnetoresistive (GMR) read heads, improved recording media and improved signal processing methods such as partial response maximum likelihood (PRML). For high density information recording, magnetic disks for HDDs must have low noise characteristics and at the same time must have good thermal stability to overcome a superparamagnetic effect.

Figure 1:
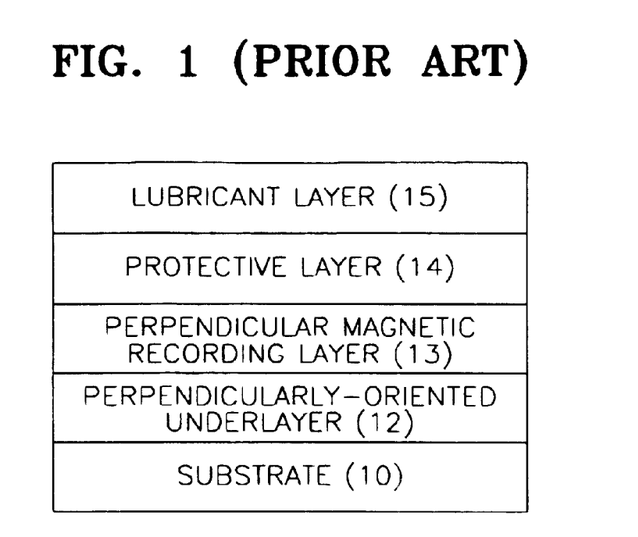
FIG. 1 is a schematic sectional view of a conventional perpendicular magnetic recording medium.

FIG. 1 is a schematic sectional view of a conventional perpendicular magnetic recording medium. A template (see FIG. 1) underlayer 12 to induce perpendicular orientation of a perpendicular magnetic recording layer, perpendicular magnetic recording layer 13, a protective layer 14 to protect the perpendicular magnetic recording layer 13 from oxidation and mechanical wear, and a lubricant layer 15 are stacked in that order on a glass or aluminum (Al) alloy substrate 10.

A process for manufacturing a perpendicular magnetic recording medium employing a conventional Co alloy recording layer will be described below with reference to FIG. 1.

CoCr or CoPt based ternary or quaternary alloys are used to form the perpendicular magnetic recording layer 13, and the perpendicular magnetic recording layer 13 must be formed such that a [0001] axis of Co hexagonal grains are oriented perpendicular to the surface of the substrate 10. For this purpose, an underlayer 12 formed of Ti or Ti alloy such as TiCr is used as a template for oriented growth of the grains of CoCrPt magnetic layers.

In general, the substrate 10 may be a glass disk, a NiP coated Al—Mg disk or a thermally oxidized silicon disk. The Ti underlayer 12 is formed by depositing Ti or TiCr on the substrate 10 by sputtering or another physical deposition method. The thickness of the underlayer is in the range of 1–200 nm and the Co alloy perpendicular magnetic recording layer 13 is formed on the underlayer 12. Here, it is important that the [0001] side of the Ti crystal grains are oriented perpendicular to the substrate surface.

In perpendicular recording, a thicker magnetic layer used in longitudinal recording media can be used for higher density recording, which is a big advantage from a thermal stability point of view. However, it is well known that a medium noise level increases with increased recording density in a conventional perpendicular recording medium, more so than in a longitudinal recording medium. In the case of longitudinal recording, transition noise, noise occurring in the region where magnetic polarity of a recorded bit changes is an important medium noise. In perpendicular recording, direct current (DC)-erased noise, noise caused by reversed domains in a recorded bit as well as transition noise become important noise sources. In order to reduce the DC-erased noise, the number of the reversed domains in the recorded bit must be reduced.

The reduction of DC-erased noise can be achieved only if a "nucleation field" of a medium exists in the second quadrant of a major hysteresis loop. The nucleation field is an external magnetic field which must be applied to initiate reversal of magnetization after saturation in one direction (see FIG. 2).

Figure 2:
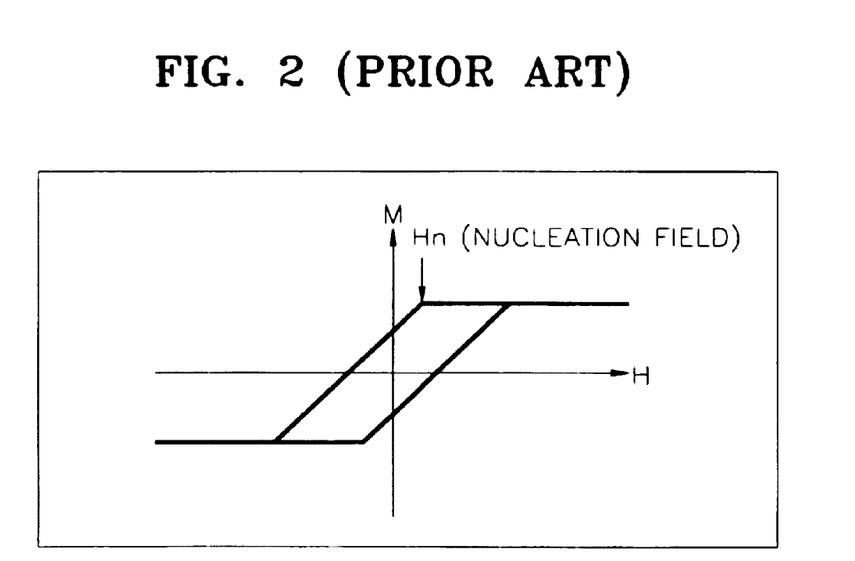
FIG. 2 is a graph of magnetization versus magnetic field showing a conventional nucleation field.

In FIG. 2, a vertical axis M is magnetization, and the horizontal axis H is applied external magnetic field. The conventional perpendicular magnetic recording media of CoCr, CoCrPt and CoCrPtX types, the most studied ones, were designed to be much thicker than a longitudinal recording medium, for higher thermal stability. The thickness explored by most investigators is in the 50 to 200 nm magnetic thickness range. A squareness ratio (SQ) of the conventional medium has a value of 0.4 to 0.8. The SQ is defined as:

$$\text{Squareness ratio } (SQ) = \frac{\text{remanent magnetization}(M_r)}{\text{saturation magnetization}(M_s)}$$

The use of a thick magnetic recording layer in perpendicular recording is based on the idea of a higher output signal and good thermal stability. However, if the thickness of the CoCrPt, CoCr, CoCrPtX alloys is greater, say beyond 50 nm, although the critical thickness depends on the composition of the magnetic layer and deposition conditions, the magnetization reversal mechanism changes from Stoner-Wolfarth type coherent rotation to incoherent rotation (Ref 1: Taek Dong Lee, Min Sig Hwang, Kyung Jin Lee, "Effects of magnetic layer thickness on negative nucleation field and Cr segregation behavior in CoCrPt/Ti perpendicular media", Journal of Magnetism and Magnetic Materials, vol. 235 (2001), p. 297–304; K. J. Lee, T. D. Lee, N.Y. Park, "step-like energy barrier variation of high Ku materials", Digest submitted abstract for Intermag 2002). This reduces the magnitude of a negative nucleation field.

When the squareness ratio is less than 1, the magnetization reversal is initiated under a positive applied field due to a self-demagnetization field created during reduction of the applied field after saturation in a positive applied field in perpendicular recording media.

However, when the squareness ratio is 1, the magnetization reversal is initiated under zero or negative applied field during reduction of the applied field after saturation in a positive applied field. Thus, when squareness is less than 1, the nucleation field for magnetic reversal is a positive applied field and we define this as "positive nucleation field". If the squareness is 1, the nucleation field for magnetic reversal is zero or a negative applied field and we define this as a "negative nucleation field".

In a medium with a positive nucleation field, magnetization reversal will occur even in a state where an external applied field is not applied, and this serves as the source of DC-erased noise. In media with 0 nucleation field or a very small negative nucleation field, magnetization reversal within a written bit also occurs due to a demagnetization field as shown in Ref. 2 (L. Wu, N. Honda, K. Ouchi, "Low noise Co/Pd multiplayer media for perpendicular magnetic recording", IEEE Trans. Magn., vol. 35(1999), p. 2775–2777).

Therefore, to reduce the DC-erased noise, a medium with a substantial negative nucleation field is necessary (Ref. 2).

In addition to this, when a ring head is used with a single layer perpendicular medium without a proper negative nucleation field, magnetization of small grains in a penultimate bit can be reversed by a reversed head field during writing a new bit as the head field has a wide distribution.

The latter phenomenon occurs more significantly in high density recording and thus, the conventional perpendicular recording media with 0 or a positive nucleation field cannot be used in a high density recording region.

SUMMARY OF THE INVENTION

To solve the above problems in the conventional perpendicular media, it is an object of the present invention to provide a CoCrPt-type perpendicular magnetic recording medium with a negative nucleation field stronger than –500 Oe. This will provide high thermal stability in a low density recording region and low noise properties in a high density recording region.

Accordingly, to achieve the above object, there is provided a perpendicular magnetic recording medium in which an underlayer for leading perpendicular orientation of a perpendicular magnetic recording layer is stacked between a substrate and the perpendicular magnetic recording layer, and the thickness of the perpendicular magnetic recording layer is controlled within the range of 5–40 nm to have a negative nucleation field.

It is preferable that the perpendicular magnetic recording layer is formed of CoCrPt alloys.

It is prefarable that the perpendicular magnetic recording layer contains 8–20 at % Pt depending on the content of Cr in the layer.

It is also preferable that the perpendicular magnetic recording layer contains 12–20 at % Cr.

It is also preferable that the perpendicular magnetic recording layer further comprises Ta, Nb or Ta+Nb in an amount of less than 4 at %.

It is also preferable that the under layer is formed of Ti-alloy.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, the present invention will be described in greater detail.

The inventors of the present invention have found a phenomenon that the properties of a magnetic loop vary greatly according to the thickness and composition of a CoCrPt alloy film. The present invention varies the structure and composition of the CoCrPt alloy film, thereby improving the properties of a perpendicular magnetic recording medium, that is, achieving a higher magnetic recording density.

Among the reported media with perpendicular magnetic anisotropy, the so-called "magneto optical recording media" such as TbFeCo and Co/Pt or Co/Pd multilayered media show negative nucleation fields. However, the TbFeCo is amorphous structure and therefore, transition noise control is not easy. Also, the situation is similar for Co/Pt or Co/Pd media. Therefore, it is more desirable to have a granular perpendicular medium such as a CoCrPt type with a negative nucleation field because intergranular magnetic decoupling is easily obtained by controlling segregation of non-magnetic elements such as Cr to reduce transition noise. For this purpose, this invention provides a CoCrPtX type perpendicular medium with a proper negative nucleation field. The medium comprises a Ti underlayer, a CoCrPtZr recording layer and a carbon protective layer. For grain size and Ti underlayer orientation control purposes, seed layers such as non-magnetic CoZr and CoNb may be used.

The present invention is characterized in that CoCrPt alloy or CoCrPt alloy to which Nb, Ta, or Ta+Nb is added, is deposited in the form of an extremely thin film having a thickness of 5–40 nm on a perpendicularly-oriented underlayer, thereby letting a nucleation field exist in a quadrant II of a magnetic loop. Beyond this thickness, a magnetic reversal mechanism changes from coherent rotation to incoherent rotation and this accompanies a reduced negative nucleation field.

The CoCrPt thin film is composed of 12–20 atomic % Cr, and preferably, 14–17 atomic % Cr, 8–20 atomic % Pt, preferably 11–20 atomic % Pt, and more preferably, 11–18 atomic % Pt, and less than 4 atomic % Ta, Nb, or Ta+Nb as a fourth or fifth element, and preferably 2–4 atomic % Ta, Nb, or Ta+Nb.

The CoCrPt layer and the CoCrPt layer with Ta or Nb as an added element as described above grow well c-axis aligned hexagonal structure Ti underlayer, although there exists about 17% lattice mismatch between the CoCrPt and Ti underlayer.

Sometimes, a very thin amorphous layer forms at the CoCrPt and Ti interface to reduce the elastic strain energy occurring from the above mentioned lattice mismatch. Magnetic properties of the CoCrPt layer and the CoCrPt layers with Ta and Nb as added elements drastically change with thickness of the CoCrPt layer and the CoCrPt layers with the fourth element, as described below.

Figure 5:
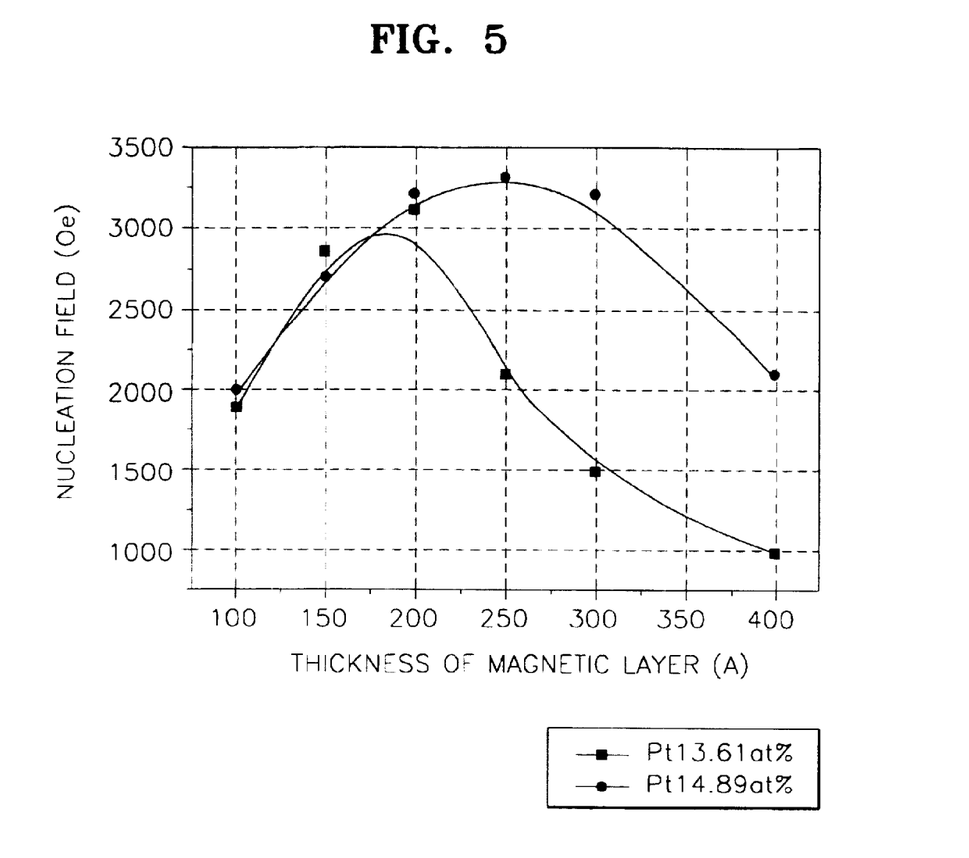
FIG. 5 illustrates variation in nucleation field according to the thickness and content of platinum (Pt) of a magnetic layer of a perpendicular magnetic recording medium according to the preferred embodiment of the present invention.
Figure 6:
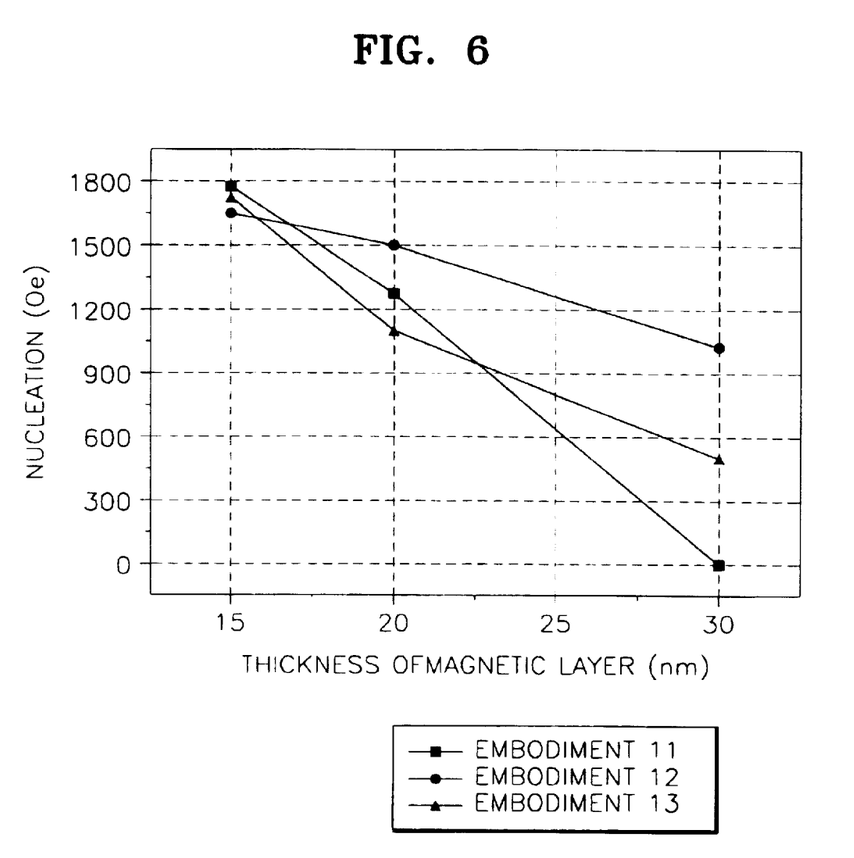
FIG. 6 illustrates variation in nucleation field according to the thickness and composition of a magnetic layer of a perpendicular magnetic recording medium according to the preferred embodiment of the present invention.

Firstly, a negative nucleation field increases initially with the magnetic recording layer thickness, shows a maximum value and decreases with further increase of the magnetic recording layer thickness (FIG. 5). The thickness of the magnetic recording layer which shows the maximum nucleation field depends upon the composition of the magnetic recording layer (FIG. 6). The reason for decrease of the negative nucleation field with increase in the magnetic layer thickness is associated with change of a magnetic reversal mechanism from coherent spin rotation at lesser thickness to incoherent spin rotation at greater thickness. Therefore, control of the magnetic layer thickness is the most important factor in achieving a proper negative nucleation field.

Secondly, as the thickness of the CoCrPt layer and the CoCrPt layer with is added Ta and Nb increases, a Cr segregation mode changes. At a thin thickness, for example 5 nm, no appreciable Cr segregation is observed. When the thickness of the CoCrPt layer is increased further, the Cr segregation to grain boundary is more enhanced. If there is no Cr segregation, magnetic exchange interaction among grains is strong and this in turn increases the negative nucleation field. On the other hand, if there is substantial Cr segregation, magnetic exchange interaction among grains become weak and the negative nucleation field decreases from an exchange interaction point of view.

However, the more important thing is a medium noise property. Medium noise should be as low as possible for higher density recording as an output signal becomes weaker. In order to reduce medium transition noise, exchange interaction among grains should be reduced by Cr or other non-magnetic element segregation at grain boundaries. This segregation behavior as well as the effect of thickness on a reproduction signal Mr·t where t represents the recording layer thickness, sets a lower limit on the thickness of the recording layer. When the CoCrPt magnetic recording layer is thicker than 10 nm, Cr segregation is observed. Therefore by controlling the thickness, sputter method, and the composition of the CoCrPt layer, Cr segregation can be controlled.

The reason the nucleation field varies according to the thickness of a magnetic layer will be described in more detail below.

In the case where the magnetic layer (or recording layer) has a thickness of more than 50 nm, as described previously, lattice mismatch occurs between the magnetic layer and the underlayer, and an initial growth layer which is magnetically unstable is formed by elastic energy between the magnetic layer and the Ti underlayer, and as a result, magnetization reversal is not uniform and generates curling or buckling structures, thereby reducing the nucleation field.

Also, an initial magnetic layer is formed by the elastic energy applied at the interface between the magnetic layer and the underlayer, thus the elastic energy is consumed resulting in hardly any elastic energy remaining at the interface between the magnetic layer and the underlayer. Thus, it is easy to segregate a crystal grain boundary of Cr in the CoCrPt magnetic layer. As a result, the saturation magnetization of the magnetic layer is increased, magnetic anisotropy energy of a crystal grain is increased, and magnetic coupling between crystal grains declines.

The relation between a demagnetization field, saturation magnetization, and magnetic anisotropy energy is:

$$\text{Demagnetization field effect} \propto (\text{saturation magnetization})^2 / (\text{magnetic anisotropy energy})$$

Thus, if the saturation magnetization and the magnetic anisotropy energy are simultaneously increased, the effect of the demagnetization field is increased, and as a result, the nucleation field is decreased.

However, like the present invention, in the case where the magnetic thin film has a thickness of 5–40 nm, the values of crystal lattice constants a and c of the CoCrPt alloy are larger than the equilibrium values of the crystal lattice constants a and c near the interface between the Ti underlayer and the CoCrPt layer. This means that there is tensile stress caused by interfacial elastic energy in the magnetic layer and simultaneously, there is no initial growth layer which would consume the interfacial elastic energy. Thus, in the case where the magnetic thin film has a thickness of 5–40 nm, there is hardly any Cr segregation in the magnetic layer.

If there is no Cr segregation, the magnetic anisotropy energy decreases. However, if the saturation magnetization is decreased and the square of the decrease in the saturation magnetization is larger than the decrease in the magnetic anisotropy energy, the nucleation field can be increased. Furthermore, if there is no Cr segregation, the magnetic exchange energy between crystal grains is large, and thus the nucleation field can be increased. For the above two reasons, in the case where the magnetic layer has a thickness of 5–40 nm, a large negative nucleation field can be achieved.

Also, the contents of Pt and Cr are decided within a predetermined range so that the CoCrPt magnetic layer has a suitable negative nucleation field. According to the results of experiments carried out by the inventors, in the case of 14–17 atomic % Cr, as the content of Pt is increased from 8 to 20 atomic %, more preferably, from 11 to 20 atomic %, the nucleation field increases. This is the main reason the magnetic anisotropy energy increases as the content of Pt increases.

Also, in the case where the content of Pt is constant at about 12 atomic %, the nucleation field does not have a negative value if the content of Cr is lower than 10 atomic %, and the nucleation field has a negative value if the content of Cr is in the range of 12–20 atomic %. In particular, the nucleation field has a maximum negative value if the content of Cr is near 14–17 atomic %, and if the content of Cr is increased more than 14–17 atomic %, the nucleation field is 0 or has a positive value. Thus, the CoCrPt alloy is composed of 12–20 atomic % Cr, and preferably, 14–17 atomic % Cr, 8–20 atomic % Pt, preferably 11–20 atomic % Pt, so that the nucleation field may have a negative value.

Also, in order to decrease noise, Ta or Nb as a fourth element which quickens Cr segregation, is added in an amount of less than 4 atomic %, preferably, 2–4 atomic %. It is not preferable that the content of Ta or Nb is increased more than 4 atomic %, because the nucleation field would greatly decrease.

Hereinafter, preferred embodiments of the present invention will be described in more detail.

<Embodiment 1>

The Ti underlayer was deposited to a thickness of 50 nm on a glass substrate having a thickness of 0.635 mm, and then, a CoCrPt alloy (74.6 atomic % Co, 17.1 atomic % Cr, and 8.3 atomic % Pt) magnetic layer which is a perpendicular magnetic recording layer was deposited to a thickness of 20 nm on the Ti underlayer, a carbon layer, as a protective layer, was deposited to a thickness of 10 nm, and a Z-DOL (0.04%) (manufactured by Ausimont Co., Ltd.) lubricant was deposited to a thickness of 2 nm, and a perpendicular magnetic recording disk was thereby produced.

<Embodiment 2>

A perpendicular magnetic recording disk was produced by the same method as in Embodiment 1 except that 70.1 atomic % Co, 16.9 atomic % Cr, and 10.5 atomic % Pt were used to form the perpendicular magnetic layer.

<Embodiment 3>

A perpendicular magnetic recording disk was produced by the same method as in Embodiment 1 except that 70.1 atomic % Co, 16.3 atomic % Cr, and 13.6 atomic % Pt were used to form the perpendicular magnetic layer.

<Embodiment 4>

A perpendicular magnetic recording disk was produced by the same method as in Embodiment 1 except that 69.6 atomic % Co, 15.5 atomic % Cr, and 14.1 atomic % Pt were used to form the perpendicular magnetic layer.

<Embodiments 5–8>

A perpendicular magnetic recording disk was produced by the same method as in Embodiments 1–4 except that the thickness of the perpendicular magnetic recording layer was set to 10 nm.

Figure 3A:
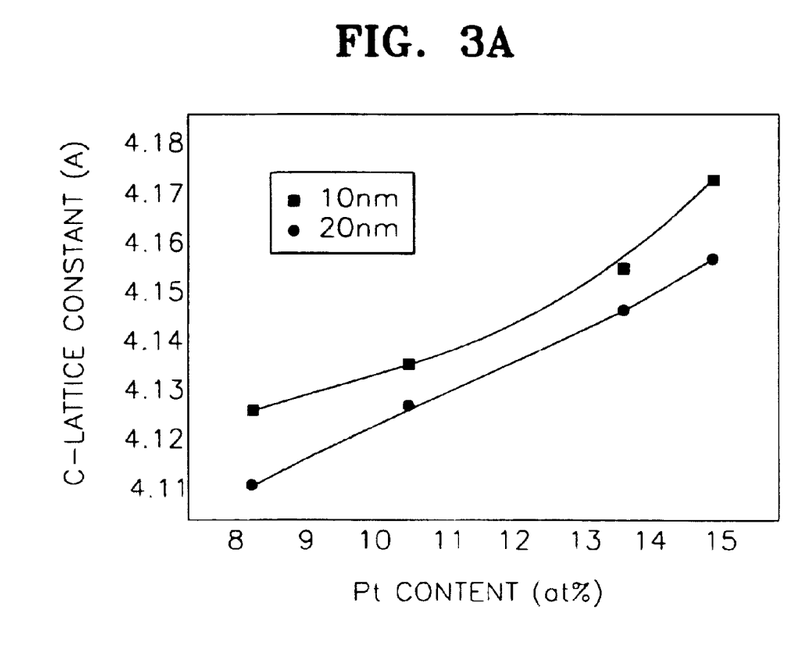
FIGS. 3A and 3B are graphs illustrating variation in crystal lattice constants a and c, respectively, of a perpendicular magnetic recording thin film according to a preferred embodiment of the present invention.
Figure 3B:
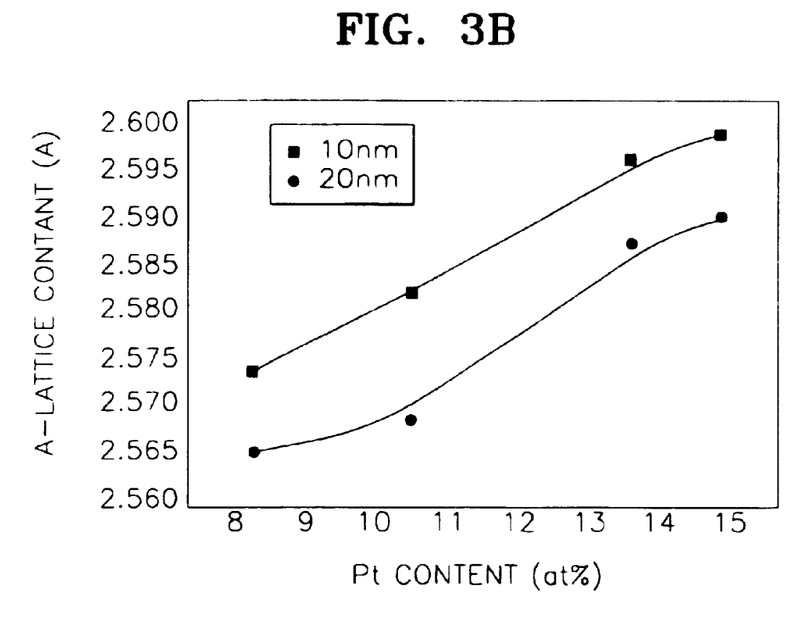

Crystal lattice constants a and c of the CoCrPt alloy, which are based on variation in content and thickness of the magnetic layer of the perpendicular magnetic recording disk in Embodiments 1–4 and 5–8, were measured at the interface between the Ti underlayer and the CoCrPt layer and are shown in FIGS. 3A and 3B.

Referring to FIGS. 3A and 3B, as the content of Pt is increased, the crystal lattice constants a and c increase, and in particular, when the thickness of the perpendicular magnetic recording layer is 10 nm, the crystal lattice constants a and c are larger than those in the case of 20 nm thickness. The thinner the magnetic layer, the more expansive is the lattice structure of the magnetic layer. Thus, lattice expansion is caused by elastic energy between the underlayer and the magnetic layer.

Figure 4:
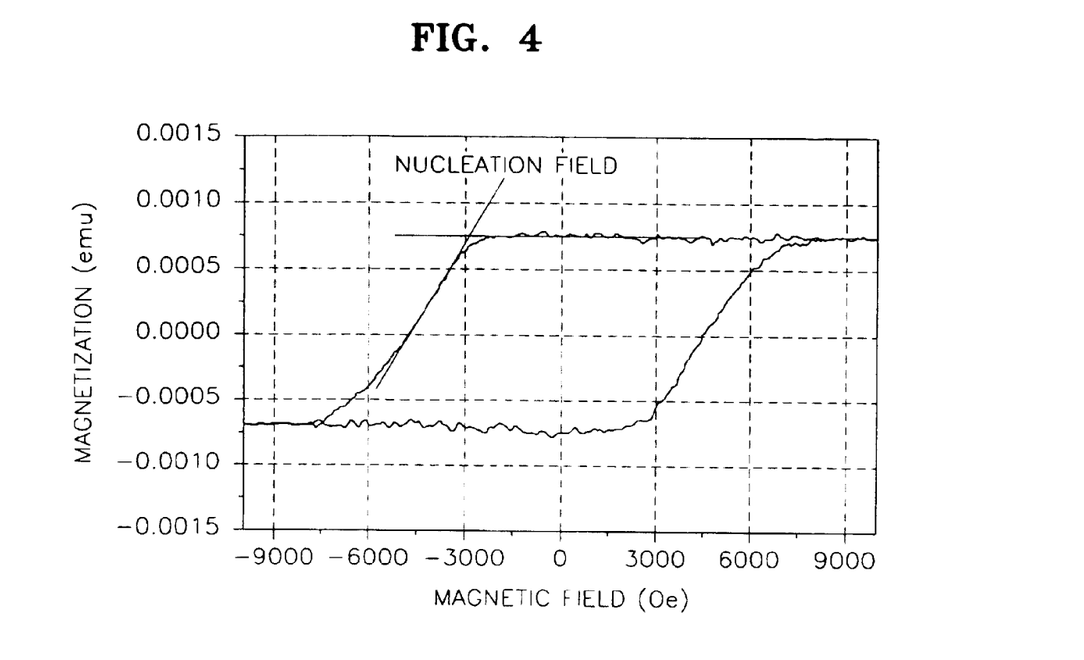
FIG. 4 is a graph of magnetization versus magnetic field showing a nucleation field of a perpendicular magnetic recording medium according to the preferred embodiment of the present invention.

In FIG. 4, the nucleation field was measured for the magnetic recording disk of Embodiment 3 and has a negative value.

<Embodiment 9>

Perpendicular magnetic recording disks were produced by the same method as in Embodiment 3 except that the thickness of the perpendicular magnetic recording layer was set to 10 nm, 15 nm, 20 nm, 25 nm, 30 nm, and 40 nm.

<Embodiment 10>

Perpendicular magnetic recording disks were produced by the same method as in Embodiment 4 except that the thickness of the perpendicular magnetic recording layer was set to 10 nm, 15 nm, 20 nm, 25 nm, 30 nm, and 40 nm.

FIG. 5 illustrates variation in nucleation field according to the thickness and composition of platinum (Pt) of a magnetic layer of the perpendicular magnetic recording media according to Embodiments 8 and 10. Here, they axis denotes positive values when the nucleation field exists on a quadrant II. In FIG. 5, the thickness of the magnetic layer is varied according to the content of Pt to have a maximum nucleation field value. The composition of the magnetic layer as well as the thickness of the magnetic layer are important in obtaining the maximum nucleation field value.

<Embodiment 11>

A perpendicular magnetic recording disk was produced by the same method as in Embodiment 1 except that the perpendicular magnetic recording layer was formed of CoCrPt Ta alloy (69.8 atomic % Co, 16.1 atomic % Cr, 12.0 atomic % Pt, and 2.1 atomic % Ta).

<Embodiment 12>

A perpendicular magnetic recording disk was produced by the same method as in Embodiment 11 except that 67.7 atomic % Co, 18.9 atomic % Cr, 11.5 atomic % Pt, and 2.1 atomic % Ta were used to form the perpendicular magnetic recording layer.

<Embodiment 13>

A perpendicular magnetic recording disk was produced by the same method as in Embodiment 11 except that 66.6 atomic % Co, 20.0 atomic % Cr, 11.4 atomic % Pt, and 2.0 atomic % Ta were used to form the perpendicular magnetic recording layer.

FIG. 6 illustrates variation in nucleation field according to the thickness and composition of a magnetic layer of the perpendicular magnetic recording medium according to Embodiments 11–13 of the present invention. Here, the y axis denotes positive values when the nucleation field exists on a quadrant II. In FIG. 6, the nucleation field has a negative value for a thickness of the magnetic layer according to the present invention even though the fourth element such as Ta, is added to the magnetic layer.

Figure 7:
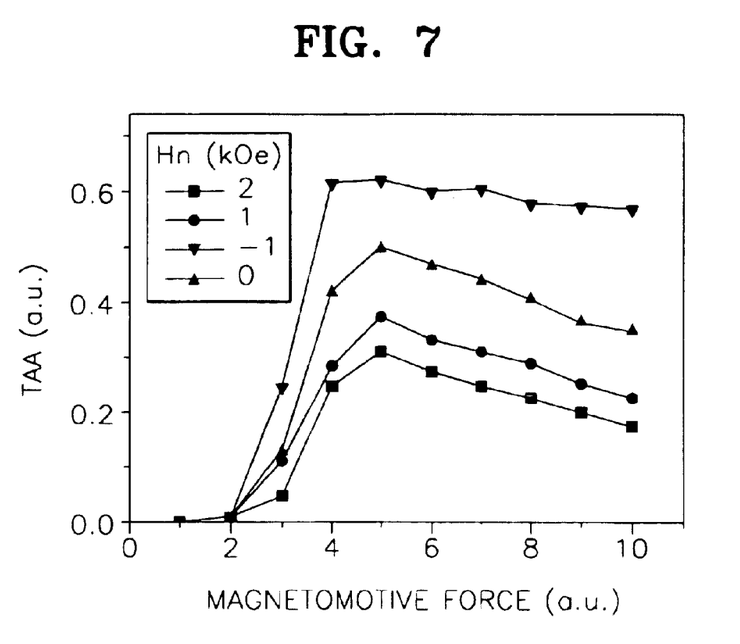
FIG. 7 illustrates a current saturation curve according to the nucleation field and the size of current, obtained from numerical simulation.

FIG. 7 is a graph of numerical simulation results showing current saturation curves which represent the output of a perpendicular recording medium according to the size of current which is applied to a recording head, when the value of the nucleation field (Hn) is each of −1, 0, 1, and 2. In the case where the medium has a non-existent or a positive nucleation field, output is a maximum at a predetermined current value and decreases as the current is increased. However, in the case where the medium has a negative nucleation field, the output is larger and has a fairly constant value as the current is increased.

Figure 8:
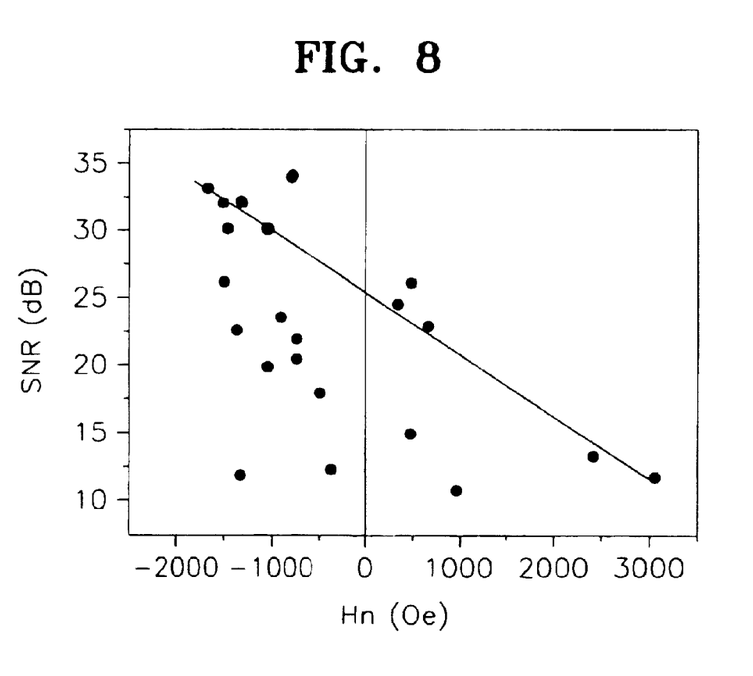
FIG. 8 is a graph of a signal to noise ratio (SNR) versus the nucleation field, obtained from numerical simulation.

FIG. 8 is a graph of numerical simulation results showing a signal to noise ratio (SNR) according to variation in the nucleation field. In FIG. 8, the SNR shows an overall increase as the nucleation field becomes more negative.

In hard disk drives (HDDs), information is recorded within a predetermined frequency band, and it is absolutely advantageous that high output values are obtained both at low recording frequency and at high recording frequency. Since the current value which represents the maximum output decreases as the recording frequency is increased, the characteristics of the output value being constantly saturated according the size of current means that the perpendicular magnetic recording medium according to the present invention is very useful for high-density recording.

As a result, the negative nucleation field which is obtained by adjusting the thickness and composition of the magnetic layer increases signal strength and decreases noise, thereby realizing high-density perpendicular magnetic recording.

The CoCrPt magnetic layer having the negative nucleation field is used in the perpendicular magnetic recording medium according to the present invention. The recording thin film has the negative nucleation field, and thus the number of reversed domains is decreased in high-density recording, thereby increasing signal strength and obtaining a high SNR due to decrease in DC-erased noise.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A perpendicular magnetic recording medium in which an underlayer for leading perpendicular orientation of a perpendicular magnetic recording layer is stacked between a substrate and the perpendicular magnetic recording layer, wherein the thickness of the perpendicular magnetic recording layer is controlled within the range of 5–40 nm to have a negative nucleation field stronger than −500 Oe, wherein the perpendicular magnetic recording layer is formed of Co-Cr-Pt-alloy and wherein the perpendicular magnetic recording layer further comprises Ta, Nb, or Ta+Nb in an amount of less than 4 atomic %.

2. The perpendicular magnetic recording medium as claimed in claim 1, wherein the perpendicular magnetic recording layer contains 8–20 atomic % Pt.

3. The perpendicular magnetic recording medium as claimed in claim 1, wherein the perpendicular magnetic recording layer contains 11–20 atomic % Pt.

4. The perpendicular magnetic recording medium as claimed in claim 1, wherein the perpendicular magnetic recording layer contains 11–18 atomic % Pt.

5. The perpendicular magnetic recording medium as claimed in claim 1, wherein the perpendicular magnetic recording layer contains 12–20 atomic % Cr.

6. The perpendicular magnetic recording medium as claimed in claim 1, wherein the perpendicular magnetic recording layer contains 14–17 atomic % Cr.

7. A perpendicular magnetic recording medium in which an underlayer for leading perpendicular orientation of a perpendicular magnetic recording layer is stacked between a substrate and the perpendicular magnetic recording layer, wherein the thickness of the perpendicular magnetic recording layer is controlled within the range of 5–40 nm to have a negative nucleation field stronger than −500 Oe, wherein the perpendicular magnetic recording layer is formed of Co-Cr-Pt-alloy, wherein the perpendicular magnetic recording layer further comprises Ta, Nb, or Ta+Nb in an amount of less than 2 atomic %.

8. The perpendicular magnetic recording medium as claimed in claim 7, wherein the perpendicular magnetic recording layer contains 11–20 atomic % Pt.

9. The perpendicular magnetic recording medium as claimed in claim 7, wherein the perpendicular magnetic recording layer contains 11–18 atomic % Pt.

10. The perpendicular magnetic recording medium as claimed in claim 7, wherein the perpendicular magnetic recording layer contains 12–20 atomic % Cr.

11. The perpendicular magnetic recording medium as claimed in claim 7, wherein the perpendicular magnetic recording layer contains 14–17 atomic % Cr.

12. The perpendicular magnetic recording medium as claimed in claim 7, wherein the perpendicular magnetic recording layer is formed of Co-Cr-Pt-alloy containing 8–20 atomic % Pt and 12–20 atomic % Cr.

13. The perpendicular magnetic recording medium as claimed in claim 7, wherein the perpendicular magnetic recording layer further comprises Ta, Nb, or Ta+Nb in an amount of less than 4 atomic %.

14. The perpendicular magnetic recording medium as claimed in claim 1, wherein the under layer is formed of Ti-alloy.

* * * * *